United States Patent
Langan et al.

(10) Patent No.: US 12,276,266 B2
(45) Date of Patent: Apr. 15, 2025

(54) ENGINE OPERATING USING A COMPRESSION SMA MATERIAL

(71) Applicant: EXERGYN LTD., Dublin (IE)

(72) Inventors: Mike Langan, Dublin (IE); Keith Warren, Dublin (IE); Kevin O'Toole, Dublin (IE)

(73) Assignee: EXERGYN LTD., Dublin (IE)

( * ) Notice: Subject to any disclaimer, the term of this patent is extended or adjusted under 35 U.S.C. 154(b) by 0 days.

(21) Appl. No.: 18/276,419

(22) PCT Filed: Feb. 11, 2022

(86) PCT No.: PCT/EP2022/053449
§ 371 (c)(1),
(2) Date: Aug. 8, 2023

(87) PCT Pub. No.: WO2022/171843
PCT Pub. Date: Aug. 18, 2022

(65) Prior Publication Data
US 2024/0309857 A1  Sep. 19, 2024

(30) Foreign Application Priority Data

Feb. 11, 2021 (GB) ........................... 2101938

(51) Int. Cl.
*F03G 7/06* (2006.01)
(52) U.S. Cl.
CPC ........ *F03G 7/0614* (2021.08); *F05C 2251/08* (2013.01)

(58) Field of Classification Search
None
See application file for complete search history.

(56) References Cited

U.S. PATENT DOCUMENTS

| 4,197,709 A | 4/1980 | Hochstein |
| 2017/0260973 A1* | 9/2017 | Larson ................... B64C 3/40 |
| 2021/0148340 A1* | 5/2021 | Tirca ...................... F03G 7/065 |

FOREIGN PATENT DOCUMENTS

| WO | 2014198955 A1 | 12/2014 |
| WO | WO-2018229233 A1 * | 12/2018 ............ F03G 7/065 |

* cited by examiner

*Primary Examiner* — Shafiq Mian
(74) *Attorney, Agent, or Firm* — NIXON PEABODY LLP; David S. Resnick; Sorinel Cimpoes

(57) ABSTRACT

Energy recovery device and method for recovering energy comprising an engine comprising a plurality of elongated Shape Memory Alloy (SMA) elements or Negative Thermal Expansion (NTE) elements configured as a core and connected to a drive mechanism; an immersion chamber adapted for housing the engine and adapted to be sequentially filled with fluid to allow a heating cycle and a cooling cycle of the SMA elements or NTE elements to expand and contract the SMA elements or NTE elements; and a compression device configured to apply a compressive mechanical force to at least one of the SMA elements or at least one of the NTE elements. The applied compressive mechanical force compresses the at least one SMA element or the at least one NTE element further during the cooling cycle.

11 Claims, 7 Drawing Sheets

Intra-stack Arrangement Example

Multi-stack V1 Arrangement Example

Multi-stack V2 Arrangement Example

ENGINE OPERATING USING A COMPRESSION SMA MATERIAL

CROSS REFERENCE TO RELATED APPLICATIONS

This Application is a 35 U.S.C. § 371 National Phase Entry of International Patent Application No. PCT/EP2022/053449 filed Feb. 11, 2022, which designates the U.S. and claims benefit under 35 U.S.C. § 119 (a) of GB Application No. 2101938.5 filed Feb. 11, 2021, the contents of which are incorporated herein in their entireties by reference.

FIELD

The present application relates to the field of energy recovery and in particular an engine that makes use of Shape-Memory Alloys (SMAs) or Negative Thermal Expansion (NTE) materials.

BACKGROUND

Low-grade heat, which is typically considered less than 100 degrees Celsius, represents a significant waste energy stream in industrial processes, power generation and transport applications. Recovery and re-use of such waste streams is desirable. An example of a technology which has been proposed for this purpose is a Thermoelectric Generator (TEG). Unfortunately, TEGs are relatively expensive. Another largely experimental approach that has been proposed to recover such energy employs Shape-Memory Alloys.

A Shape-Memory Alloy (SMA) is an alloy that "remembers" its original, cold-worked shape which, once deformed, returns to its pre-deformed shape upon heating. This material is a lightweight, solid-state alternative to conventional actuators such as hydraulic, pneumatic, and motor-based systems.

The three main types of Shape-Memory Alloys are the copper-zinc-aluminium-nickel, copper-aluminium-nickel, and nickel-titanium (NiTi) alloys but SMAs can also be created, for example, by alloying zinc, copper, gold and iron. The list is non-exhaustive.

The memory of such materials has been employed or proposed since the early 1970s for use in heat recovery processes and in particular by constructing SMA engines which recover energy from heat as motion. Recent publications relating to energy recovery devices include PCT Patent Publication number WO2013/087490, assigned to the assignee of the present invention. The energy recovery device consists of an engine core having a plurality of elongated wires arranged in a bundle type configuration or closely packed together. It is desirable to translate the contraction of the SMA or Negative Thermal Expansion (NTE) wire material into a mechanical force in an efficient manner. SMA material exhibits a complex stress-strain-temperature relationship. Typically a combination of stress and temperature are involved in the transformation of the SMA material from its 'de-twinned' martensite phase to austenite phase.

GB2,533,357 (Exergyn) deals with utilising a core to provide the force to return the material in its extended martensite state and a spring to damp any deviations in a smooth operation in an antagonistic arrangement. US 2014/007572 (GM Global) describes ways to enhance the performance of the material in various high environmental temperatures by offering the right amount of return force in its martensitic state. U.S. Pat. No. 5,442,914 (Otsuka) discloses a Shape Memory Alloy (SMA) heat engine which includes at least one stack of conical disc springs mounted in a perforated tube. This engine works by tensioning the SMA heat engine which does not provide an efficient output. And leads to breakages in the SMA material due to tension stress.

Fatigue life is a large problem with tensioning or stressing SMA materials as the material tends to break down as would happen with the aforementioned prior art. In cases where SMA wires are used the wires crack. When there is a load on the wire during its fully martensitic (or fully austenitic) phase, it strains according to Young Modulus. The austenitic and twinned martensite states happen naturally in the wire even if no external stress is applied. A drawback of 25 an unloaded shape memory alloy being the fact that the wire is not obtaining any specific deflection and the transition happens only based on a temperature difference. In order to obtain a useful output from the wire cycling one has to apply a stress to it. The magnitude of the stress depends on the desired deformation. It has been found that problems occur with limited SMA wire elongation associated with some shape memory alloy or NTE materials. In addition, limited elongations occur due to not achieving a low enough wire temperature during the cooling/relaxation cycle. This limitation of the amount of wire strain available for recovery during the power stroke means a limitation is put on the power output.

It is therefore an object to provide an improved system and method for generating a larger power output from a SMA or NTE engine core for use in an energy recovery device.

SUMMARY

According to the present invention there is provided, as set out in the appended claims, energy recovery device comprising:
  an engine comprising a plurality of Shape Memory Alloy (SMA) elements or Negative Thermal Expansion (NTE) elements configured to define a core and optionally connected to a drive mechanism;
  an immersion chamber adapted for housing the engine and adapted to be sequentially filled with fluid to allow a heating cycle and a cooling cycle of the SMA elements to expand and contract the SMA elements; and
  a compression device configured to apply a compressive force to at least one of the SMA elements during the heating cycle and/or cooling cycle.

The invention makes use of a mechanical compression device and method to compress the SMA elements defining a core during use. Compression of the engine increases the fatigue life of the material, and reduces maintenance of the overall core. This reduces the overall through life costs and simplifies the system design as no access to the SMA components is required for maintenance purposes. In addition, using a core design under compression allows lower grade SMA material to be used which is lower cost and can increase the cycle rate which thus reduces the amount of SMA material used.

Mechanical compression of the SMA elements reduces the maintenance costs and will enable the technology to generate power for less effectively, thus opening up the market to many power generation applications.

In one embodiment there is provided the step of applying a controlled compression.

In another embodiment there is provided an energy recovery device comprising:
  an engine comprising a plurality of elongated Shape Memory Alloy (SMA) elements or Negative Thermal Expansion (NTE) elements fixed at a first end and connected at a second end to a drive mechanism;
  an immersion chamber adapted for housing the engine and adapted to be sequentially filled with fluid to allow a heating cycle and a cooling cycle of the SMA elements to expand and contract the SMA elements; and
  a controlled mechanical compression is applied to at least one of the SMA elements during the cooling cycle.

In one embodiment the SMA elements comprises at least one stack of a plurality of plates wherein at least two plates formed by a shape-memory alloy are assembled one on top of another.

In one embodiment the plates are assembled one on top of another and each plate has a plurality of fluid ports machined on it which enables passage of a fluid at a particular temperature through the stack. The fluid is introduced to the stack through an intake port and after passing through the stack, the fluid is externally discharged through an exhaust port.

In a preferred embodiment of the present invention, the intake port and the exhaust port are independent structural units and are formed using the same SMA used for making the plates. Further, at least one stack of a plurality of SMA plates comprises an SMA core.

In one embodiment the SMA element or SMA plates are formed using an additive manufacturing or 3D printing process.

As per a preferred embodiment of the present invention, an SMA core is positioned inside a housing having a plurality of buckling supports adapted to keep intact the stacked plates of at least one SMA core while a load is applied.

In one embodiment, the composition of the SMA forming each of the plurality of stacked plates is the same. In another embodiment of the present invention, composition of the SMA forming at least one plate is different from that of the other plates in the stack.

In another embodiment of the present invention, multiple SMA cores are positioned within the housing and the composition of the SMA forming the plurality of plates stacked in one SMA core is different from the composition of the SMA forming the plurality of plates stacked in the other SMA cores.

The present invention increases the surface area between the SMA material and the fluid. Further, as the fluid passes through the SMA plate stack, it contacts only the SMA material which reduces overall thermal losses.

The construction of the intake port and the exhaust port using SMA material further reduces thermal loss. The formation of a stack described in the present invention resists buckling and reduces the requirement for external support.

In one embodiment wherein the compression device comprises an electromechanical actuator.

In one embodiment the compression device comprises a hydraulic compression module configured to apply pressure to a piston using a pressurised hydraulic fluid.

The housing and the buckling support ensures that the SMA plates are thermally isolated and can withstand an applied hydraulic load while also allowing movement of the individual stacks when under compression. The present invention also enables easy upgrade of engine cores due to the ease of swapping one SMA stack with another.

This means that if a better SMA composition becomes available, it is easy to swap the stack with plates formed from the old SMA composition with a stack with plates formed by the new and improved SMA composition.

In one embodiment there is provided an engine core for use in energy recovery comprising
  at least one stack of a plurality of plates at least two plates formed by a shape-memory alloy and assembled one on top of another, the plurality of shape-memory alloy plates having a plurality of fluid ports, for example a serpentine shaped port, adapted to allow passage of a fluid through the stack;
  an intake port adapted to introduce the fluid into the stack; and
  an exhaust port adapted to externally discharge the fluid introduced through the intake port, the intake port and the exhaust port formed by the shape-memory alloy.

In another embodiment there is provided an engine for use in energy recovery comprising:
  at least one stack of a plurality of plates at least two plates formed by a shape-memory alloy and assembled one on top of another, the plurality of shape-memory alloy plates having at least one fluid port adapted to allow passage of a fluid through the stack;
  a compression device configured to apply a compressive mechanical force to at least one of the SMA plates during a heating cycle and/or cooling cycle;
  an intake port adapted to introduce the fluid into the stack; and
  an exhaust port adapted to externally discharge the fluid introduced through the intake port, the intake port and the exhaust port formed by the shape-memory alloy.

In one embodiment compression device applies the mechanical force to at least one of the SMA plates during the cooling cycle.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

The invention relates to a heat recovery system, for example an engine, which can use either Shape Memory Alloys (SMAs) or other Negative Thermal Expansion materials (NTE) (commonly referred to as elastocaloric materials) to generate a larger power output from a heated fluid using compression. The invention provides an engine cycle where the SMA is compressed. In compression mode, the fatigue life is longer and is no longer a limitation. The compression load is significantly higher than the tension load and this gives higher efficiency.

A known energy recovery device is described in PCT Patent Publication number WO2013/087490, assigned to the assignee of the present invention, and is incorporated fully herein by reference.

For such an application, the contraction of such material on exposure to a heat source is captured and converted to usable mechanical work. A useful material for the working element of such an engine has been proven to be Nickel-Titanium alloy (NiTi). This alloy is a well-known Shape-Memory Alloy and has numerous uses across different industries. It will be appreciated that any suitable SMA or NTE material can be used in the context of the present invention. Elongated lengths or wires have been proposed in such an engine, however it is found due to the stress applied that the wires tend to break down.

Force is generated through the contraction and expansion of the SMA material during a hot cycle and a cold cycle within a working core, via a piston and transmission mechanism. An important aspect of the system is that a reliable assembly is created, enabling high-force, low displacement work to be performed for a maximum number of working cycles.

Figure 1:
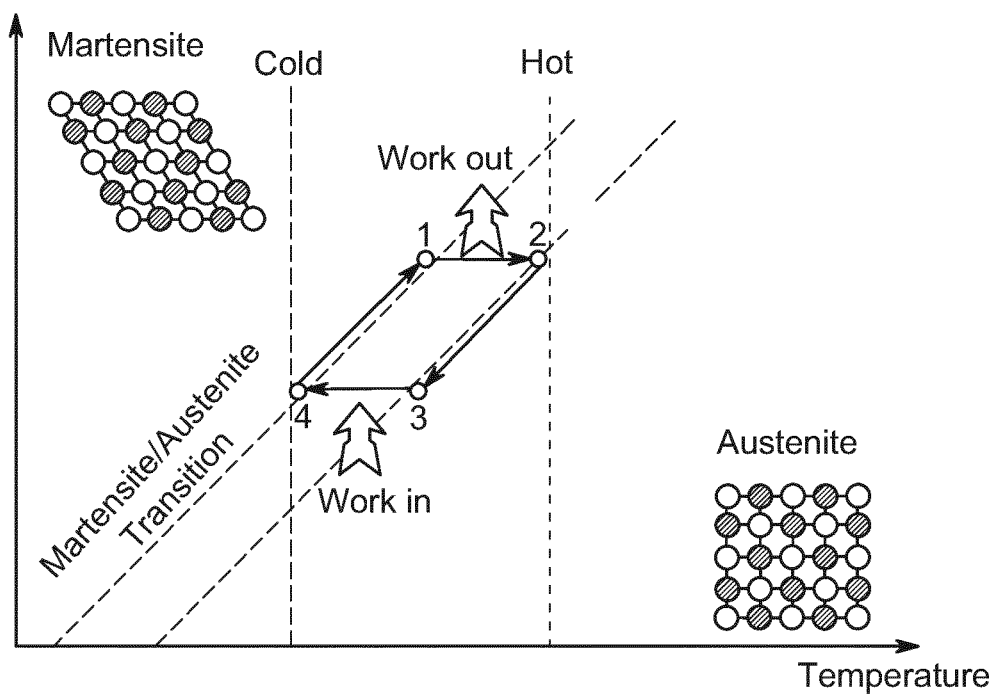
—
  FIG. 1 illustrates a SMA material work cycle between a heating and cooling cycle.

FIG. 1 illustrates a SMA material work cycle between a heating and cooling cycle. The invention described herein outlines a system and method to increase the work output of a shape memory alloy during a hot and cold cycle. An important aspect of the invention is to compress the SMA material during cycles.

In compression mode, the fatigue life of the SMA material or core is longer and no longer a limitation. The compression load can be significantly higher than the tension load and thus compressing the SMA material provides increased output and higher efficiency.

The thermodynamic engine cycle may be constructed from a traditional gas cycle such as the Stirling, Brayton or Ericsson cycle or a combination of any of these cycles, as illustrated in FIG. 1.

As shown in FIG. 1 the cycle can be constructed such that as the SMA material absorbs heat from a hot temperature source [process 1-2], the material will attempt to recover from a deformed material state [Marchtensite-Austenite]. This causes the material to expand and therefore work may be extracted using a hydraulic cylinder or other device.

Once this process has completed, the material temperature is cooled using a heat recovery circuit/s until the material temperature is close to the cold source temperature [Process 2-3]. At this point a low compressive load is applied to material to raise its activation temperatures and therefore cause the material to compress. In doing this the material contracts and rejects heat to the cold source [process 3-4]. Once complete the heat recovery circuit is again used to raise the temperature of the material using the stored heat in the heat recovery circuit. At this point the cycle is complete.

The compressing of the SMA elements or material on the cold cycle can be employed using a suitable mechanical or tensioning mechanism such as a power module. The power control module can be controlled independently.

The required strain is achieved by mechanically compressing the SMA elements. The power control module for applying the compression can be implemented in a number of ways. Compression of the SMA elements can be achieved using a wide range of compression technologies including electromechanical and hydraulic compression. Suitable electromechanical actuators convert rotary motion from an electric motor to linear motion. Most designs are similar to a nut and a bolt with the threaded bolt attached to the motor and able to rotate, the nut is fixed to the component which is being compressed and the nut can travel up and down the shaft of the bolt. In hydraulic compression a pressure is applied to a piston by a pressurised hydraulic fluid. When the pressure is released, the SMA material can expand.

Figure 2A:
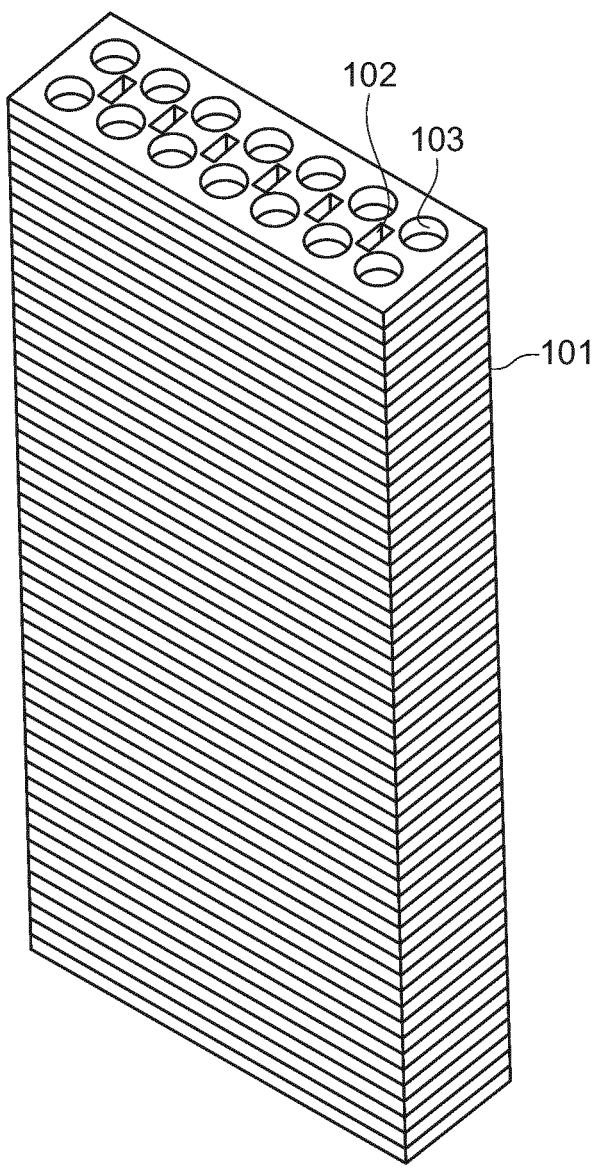
FIG. 2a is a perspective view of a preferred embodiment of the present invention.

FIG. 2a illustrates a perspective view of a preferred embodiment of the present invention. The engine disclosed comprises at least one stack of a plurality of plates 101 formed by a SMA and assembled on top of another. Each of the plurality of plates 101 have a plurality of fluid ports 102 machined on them. The fluid ports 102 are designed to allow passage of a fluid at a particular temperature through the stack of plates 101. The stack of plates 101 is adapted to absorb heat and store energy when the fluid passes through it and further comprises a plurality of plate stiffener slots 103. The plate stiffener slots 103 allow strong rods to be inserted to resist buckling when compressed. The slots 103 can be on the order of a few mm diameter and the length of the stack, and the size can be selected based on a desired design.

Figure 2B:
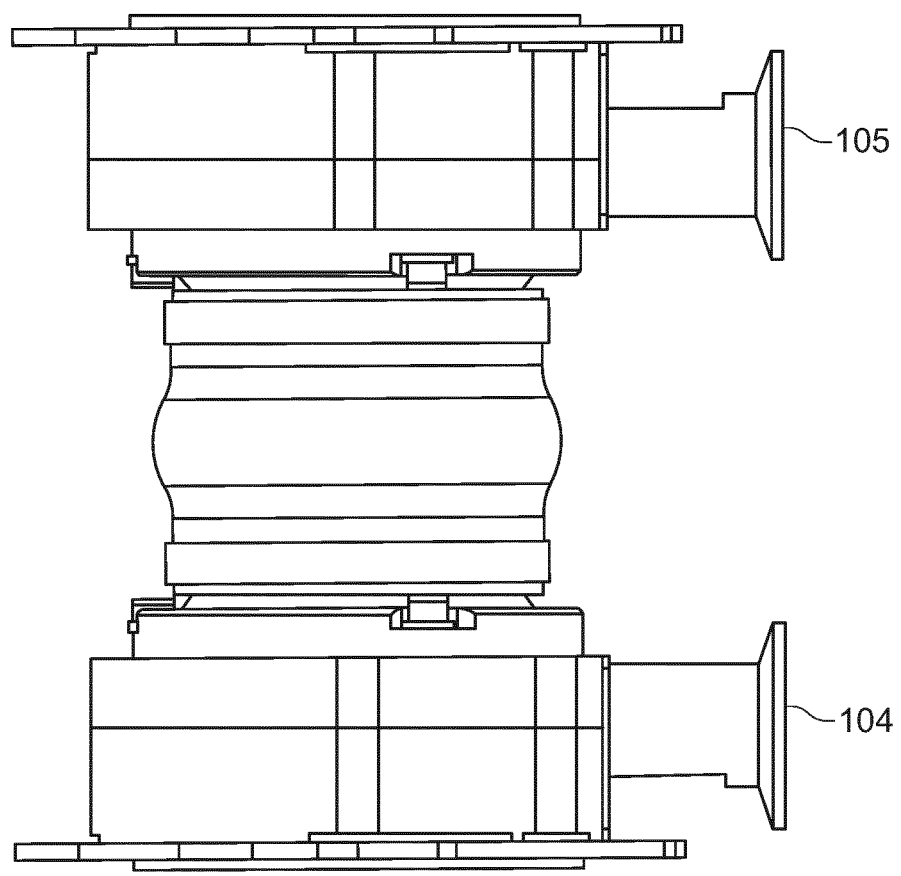
FIG. 2b illustrates a housing having a fluid inlet port and outlet port housing the engine according to an embodiment of the present invention

FIG. 2b is an example housing where the plate stack/core is located. Fluid, for example water, at a certain temperature is introduced or pumped into a chamber housing the stack/core via one inlet 104 and the fluid exits at 105. The inlet 104 adapted to introduce the fluid into the stack and the outlet 105 is adapted to externally discharge the fluid introduced through the intake port. In a preferred embodiment of the present invention, the intake port and exhaust port are independent structural units and are made using the same SMA material as that of the stack of plurality of plates to minimize heat loss. The fluid ports 102 machined in each plate enables the surface area between the plates and the fluid to be greatly increased and also ensures that the fluid is in contact only with the SMA material which reduces overall thermal losses. The fluid ports can be constructed in any geometric pattern such as grid, circular or polygonal patterns. The SMA plates 101 in the embodiment shown is substantially rectangular in shape. The SMA plate can be considered as a basic building block to construct scaled cores and engine systems. The design of the plates is a function of heat transfer optimisation and the embodiment shown is only indicative. Smaller plates and stacks can also be used in order to scale down using the same principles. It will be appreciated that the engine operates between a high stress and low stress states. Ideally low stress=cold (starting point) High stress=hot and the SMA plates are held in compression throughout the cycle. The applied compressive mechanical force provides an extra compression to the at least one SMA element further during the cooling cycle.

Figure 3A:
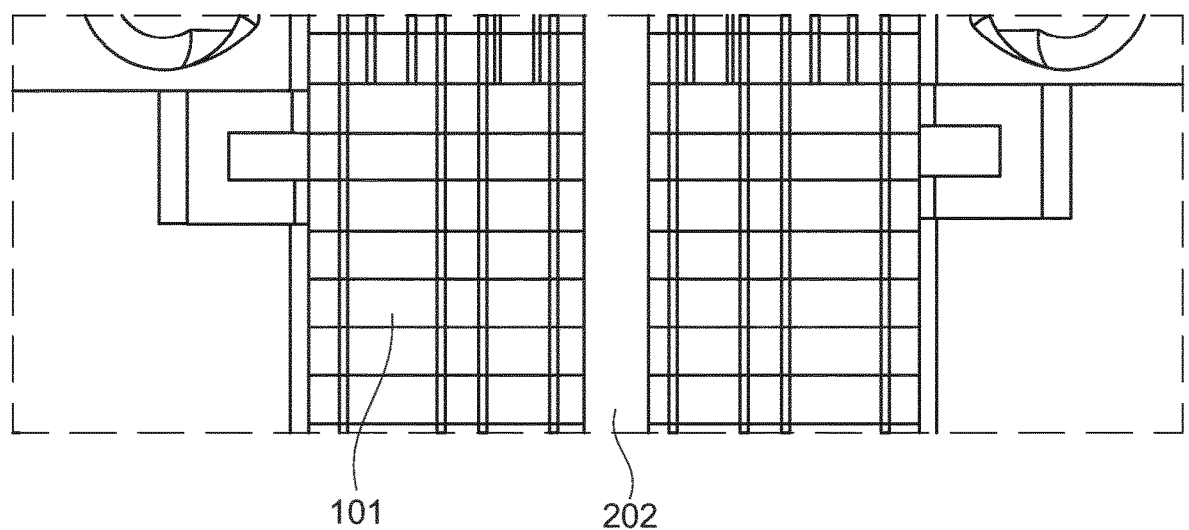
FIGS. 3a and 3b illustrates a preferred embodiment of the present invention showing a side view and a top view of a plurality of SMA material plates stacked on top of each other.
Figure 3B:
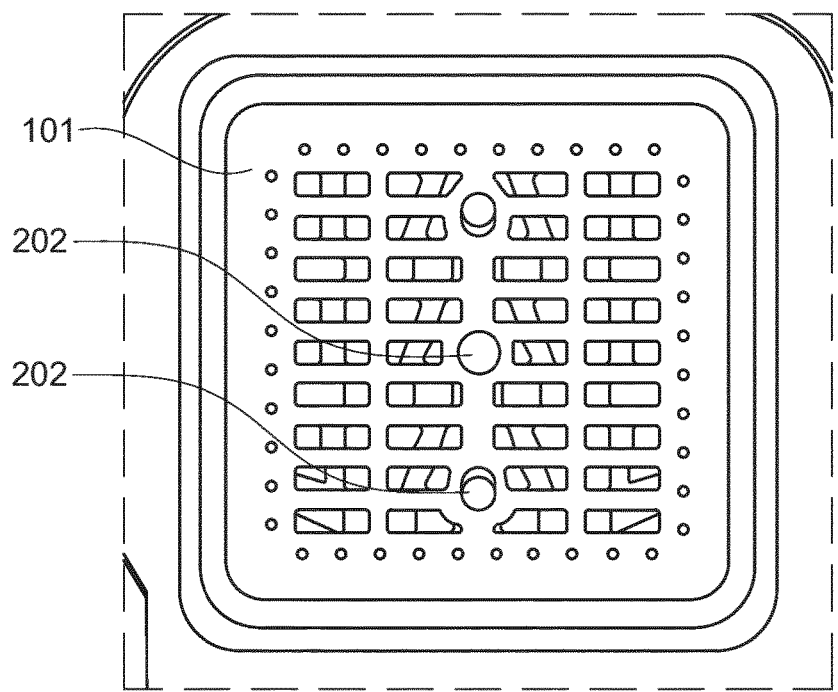

FIGS. 3a and 3b illustrates a preferred embodiment of the present invention where the core or SMA material comprises a plurality of SMA components 101 and arranged as a stack of a plurality of SMA plates 101 to define an engine core. The plurality of SMA plates 101 stacked on top of each other can be compressed during the cycle as required. Buckling supports 202 ensures that the SMA plates 101 are thermally isolated and that the overall structure is supported and able to withstand a hydraulic load.

The cycle can be a single stage or include multiple cascades as this will increase the temperature range for heat recovery.

In one embodiment the cycle comprises multiple cores and internal heat recovery between the cores or heat can be stored from a single core between cycles. This arrangement increases the efficiency of the system.

The system can include work recovery where the energy stored in the compressed material can be used directly to compress a second SMA component (engine core) or the energy can be stored and used indirectly to compress additional SMA components at a later stage.

This stored energy can be stored in the form of pressurised fluid or it can be converted into electricity and either stored or used elsewhere in the system.

Figure 4:
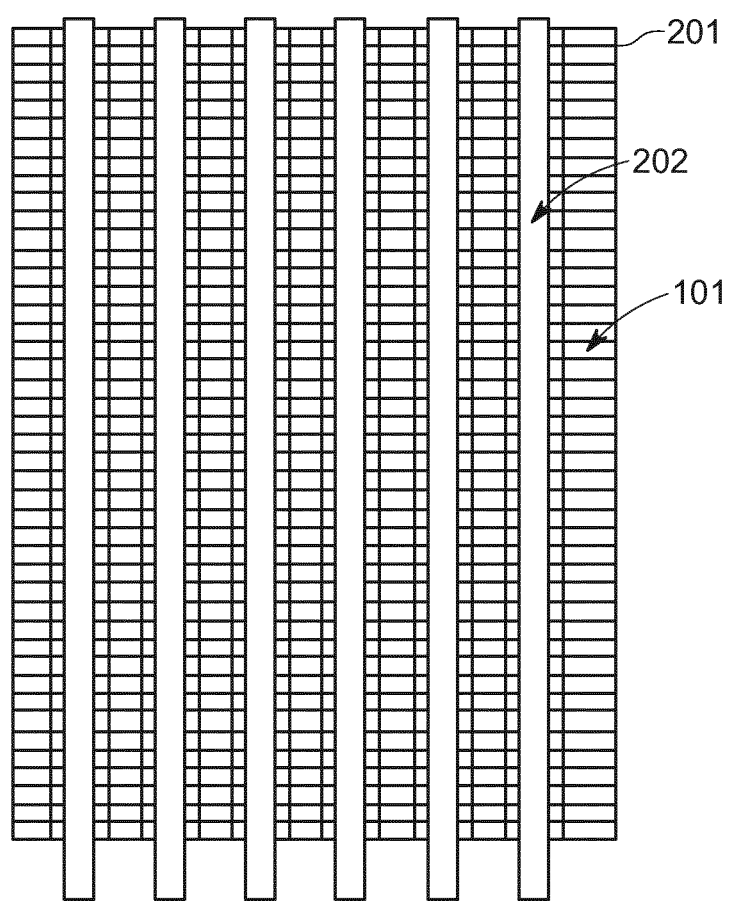
FIG. 4 is a front view of a preferred embodiment of the present invention.

FIG. 4 illustrates a front view of another preferred embodiment of the present invention. In the figure shown, the stack of SMA plates 101 forming an SMA core is positioned in a housing 201. The housing 201 has a plurality of buckling supports 202 to keep intact the SMA core when a load is applied. When compressive forces are applied to a SMA core in an engine, optimisation of the location, size and number of buckling supports is important to estimate to amount of force that can be exerted without collapsing the structure. This is in turn ensures optimal extraction of the SMA calorific properties. The housing 201 and the buckling supports 202 ensures that the SMA plates 101 are thermally isolated and that the overall structure is supported and able to withstand a hydraulic load while also allowing movement of an individual stack while under compression.

It will be appreciated that in the context of the present invention the engine/core can be assembled in a number of different configurations, as shown in FIG. 5. In one embodiment, the composition of at least one plate in a stack of SMA plates is different from that of the other plates in the stack. Different SMA material blends can be used for different SMA plates within a single stack.

In another embodiment of the present invention, an SMA core with a plurality of SMA stacks are used. In said multi stack arrangement, each stack comprises of plates with a different SMA composition, which means plates within the same stack have the same SMA composition.

In another embodiment of the present invention, multiple stacks with each stack having plurality of SMA plates are used. Each stack has at least one SMA plate with alloy composition different from that of the other plates in the same stack.

Figure 5A:
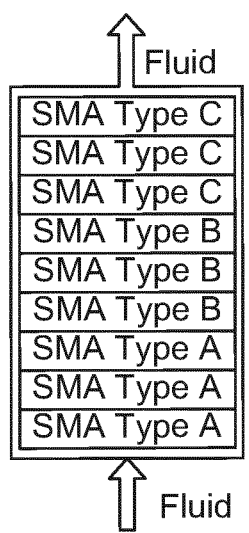
FIGS. 5(a) to 5(d) illustrates a number of cascaded arrangements of different engine cores used in an energy recovery device.
Figure 5B:
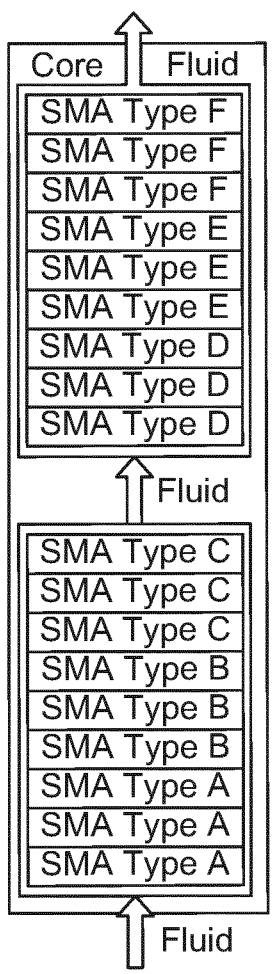
Figure 5C:
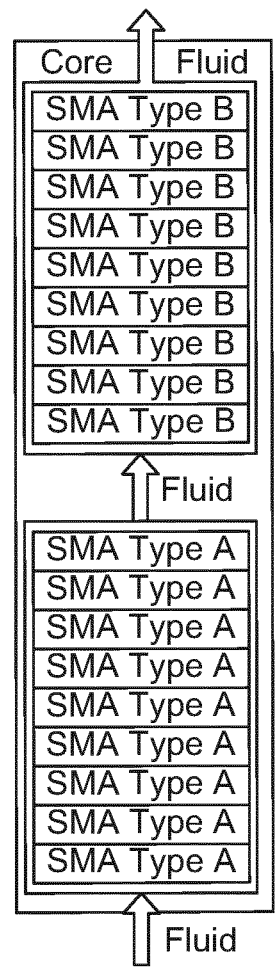
Figure 5D:
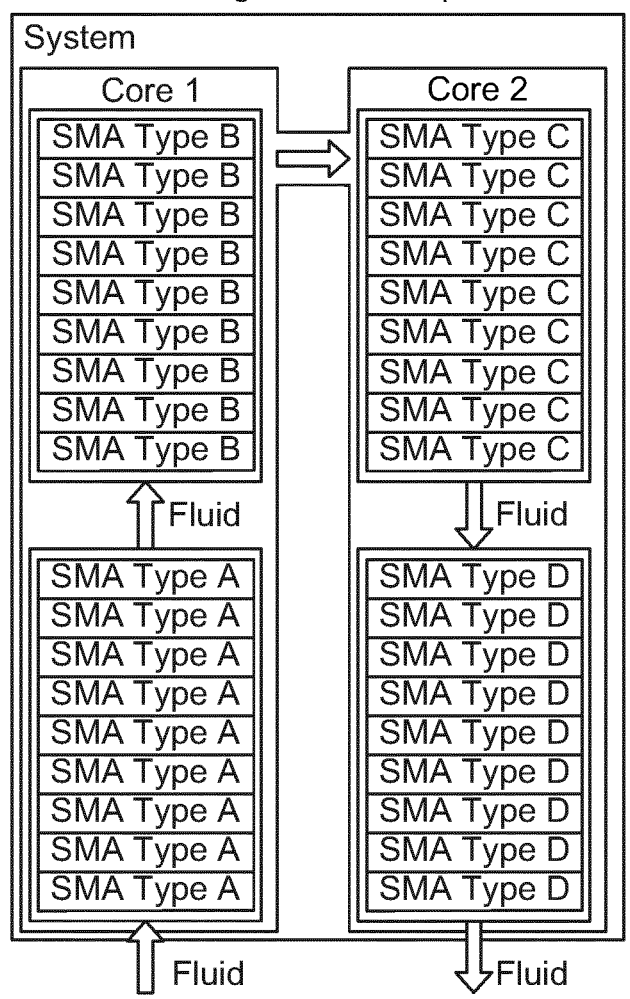

FIGS. 5(a) to 5(d) illustrates a number of cascaded arrangements of an engine according to another embodiment of the invention. Cascading the SMA plates can be used to increase deltaT can be achieved using a number of approaches. For example, FIG. 5a shows an inter-stack arrangement with different blends of optimised SMA plates can used within single stacks. E.g. blend 1, blend 2 and blend 3 plates are arranged within a single stack. FIG. 5b illustrates a multi-stack version Figure fa. Stacks of plates, each with the same SMA blend are interacted with other stacks of plates with a different SMA blend. E.g. a blend 1 stack is interacted with a blend 2 stack (and so on) in series within a multi-stack arrangement. FIG. 5c is a multi-stack version FIG. 5b. Stacks of plates, each with the multiple SMA blends are interacted with other stacks of plates with similar or different SMA blends within a multi-stack arrangement. For example, an inter-stack cascade arrangement is interacted with a different or similar inter-stack cascade arrangement in series within a multi stack arrangement. FIG. 5d illustrates a multi-core arrangement, where cores of plates, made up of either multi-stack version 1 or multi-stack version 2 or a combination of both are interacted together in series to form a cascade.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. An energy recovery device comprising:
an engine comprising a plurality of Shape Memory Alloy (SMA) elements or Negative Thermal Expansion (NTE) elements configured to define a core and connected to a drive mechanism;
an immersion chamber adapted for housing the engine and adapted to be sequentially filled with fluid to allow a heating cycle and a cooling cycle of the SMA elements or the NTE elements to expand and contract the SMA elements or the NTE elements; and
a compression device configured to apply a compressive mechanical force to at least one of the SMA elements or at least one of the NTE elements during the heating cycle and/or cooling cycle.

2. The energy recovery device as claimed in claim 1, wherein the applied compressive mechanical force compresses the at least one SMA element further during the cooling cycle.

3. The energy recovery device as claimed in claim 1, wherein the SMA elements comprises at least one stack of a plurality of plates wherein at least two plates formed by a shape-memory alloy and assembled one on top of another.

4. The energy recovery device as claimed in claim 3, wherein the plurality of shape-memory alloy plates comprises a plurality of fluid ports adapted to allow passage of a fluid through the stack.

5. The energy recovery device as claimed in claim 1, wherein the compression device comprises an electromechanical actuator.

6. The energy recovery device as claimed in claim 1, wherein the compression device comprises a hydraulic compression module configured to apply pressure to a piston using a pressurised hydraulic fluid.

7. The energy recovery device as claimed in claim 1, wherein the SMA element or SMA pates are formed using an additive manufacturing or 3D printing process.

8. The energy recovery device as claimed in claim 1, comprising a plurality of SMA cores positioned within the housing, wherein each core is configured to be compressed independently during a cycle.

9. The energy recovery device of claim 8, wherein the composition of the SMA forming the plurality of plates stacked in one SMA core is different from the composition of the SMA forming the plurality of plates stacked in the other SMA cores.

10. A method for energy recovery comprising the steps of:
arranging a plurality of elongated Shape Memory Alloy (SMA) elements or Negative Thermal Expansion (NTE) elements to define a core and connected at a second end to a drive mechanism;
housing the elements in a chamber and sequentially filling with fluid to allow a heating cycle and a cooling cycle of the SMA elements to expand and contract the SMA elements or the NTE elements; and
applying a mechanical compression to at least one of the SMA elements or the NTE elements during the cooling and/or heating cycles.

11. The method of claim 10, further comprising the step of applying compressive mechanical force to the at least one SMA element further during the cooling cycle.

\* \* \* \* \*